Dec. 11, 1962     H. E. KELCHNER     3,068,444
ELECTRICAL WIPER MOUNT
Filed Sept. 17, 1959

INVENTOR.
HARLEY E. KELCHNER
BY Karl Stoess
ATTORNEY

United States Patent Office 3,068,444
Patented Dec. 11, 1962

3,068,444
ELECTRICAL WIPER MOUNT
Harley E. Kelchner, King of Prussia, Pa., assignor to Burroughs Corporation, Detroit, Mich., a corporation of Michigan
Filed Sept. 17, 1959, Ser. No. 840,754
3 Claims. (Cl. 339—220)

The present invention relates to an electrical wiper mount and more particularly to a wiper mounted on a tubular shank.

Electrical wiper mounts have been proposed for analogous purposes heretofore, but they have been space consuming and have required many parts, close tolerances, and considerable labor to manufacture them.

Accordingly, it is an object of the present invention to reduce the number of parts and the amount of labor heretofore needed for the manufacture of wiper assemblies.

Another object of this invention is to minimize the need for high accuracy of the parts of the improved wiper mount, and consequently to allow a substantial degree of tolerance of its parts.

Another object of this invention is to make the connection between wiper base and wiper extremely durable.

Still another object of the present invention is to protect the wiper mount assembly from undesirable rotary dislocation in relation to the base plate into which it has been inserted.

The invention consists in the novel combination and arrangement of a mounting shank carrying a mounting head in a T-shape configuration, and an electrical wiper which is affixed to said head. The complete mount is adapted to be inserted into a plate and to be firmly secured directly to said plate by having a portion of the head project into the plate itself. This last feature may be accomplished by cutting a slot in the base which engages the head or by forming projecting means on the lower side of the head itself which engage the plate. Other objects and advantages of the invention will be apparent from the following description in conjunction with the accompanying drawings, in which like reference numerals refer to like parts throughout the several figures, and wherein:

Figure 1:
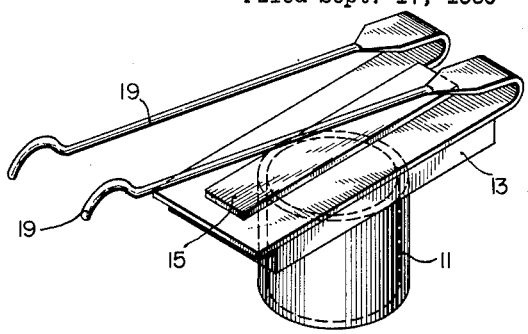
FIG. 1 is a perspective view of the wiper mount in which the wiper is attached to the mount in accordance with this invention.
Figure 2:
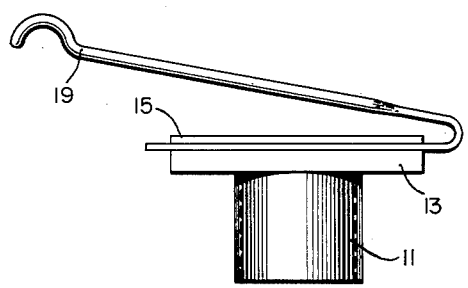
FIG. 2 is a side view of FIG. 1.

FIGS. 1 and 2 which show the improved electrical wiper mount, clearly indicate its compact, sturdy and simple construction. The mount includes a conductive cylindrical shank 11 onto one end of which a conductive head 13 is affixed in crossing relation thereto. The head 13 is characterized by upstanding locating means 15 serving the purpose of procuring a proper fit between head 13 and wiper 19 prior to the fixing by soldering or swaging of the U-shaped base of the wiper 19 to the head 13.

Figure 3:
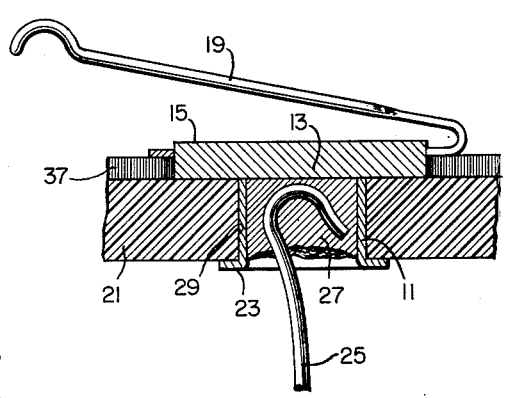
FIG. 3 shows the mount of FIGS. 1 and 2 inserted and fastened in a plate and connected to a lead-in wire.

FIG. 3 illustrates the improved wiper mount with wiper installed in a plate 21 and having an electrical conductor 25 secured to the wiper mount. A tubular shank 11 is inserted into a corresponding hole 29 of the plate 21. For securing the wiper mount to the plate 21, the shank is flanged at its lower end 23 against the plate 21 or the shank 11 is press fitted into the plate 21, whereby a solid and durable connection is attained. In order to prevent any undesirable rotation of the mount, a slot or recess 37 is provided in the plate 21 to engage snugly at least one side of the head 13.

FIG. 3 also shows the direct connection between a lead-in wire 25 and the tubular shank 11. The solder connection of the wire 25 within the shank 11 is indicated by numeral 27. The plate 21 is normally of non-conductive material. However, the use of conductive material for the plate 21 is also contemplated. In the latter case, the conductive plate would form part of the circuit rather than a lead-in wire.

Figure 4:
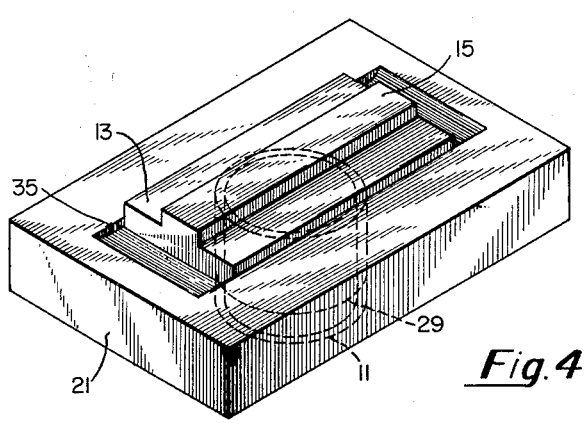
FIG. 4 is a perspective view of the mount without wiper after insertion into a plate.

FIG. 4 shows more clearly the base and anchoring portion 11, 13 of the mount after insertion into the corresponding hole 29 in the plate 21. The head 13 which sits on the tubular shank 11 bears a longitudinal projection 15 which is adapted to extend through a corresponding base opening of the wiper 19 or the separation formed by the legs of the U-shaped wiper base for the purpose of location prior to the permanent fixing of the wiper 19 to the head 13. The cut-out 35 is a modification of the slot 37 shown in FIG. 3. Its purpose is to engage at least one side of the head 13, thereby protecting it against undesirable rotation.

Figure 5:
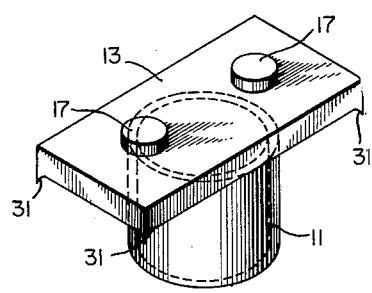
FIG. 5 is a perspective view of the mount showing a modified upper and lower surface of the mounting head.

FIG. 5 illustrates a modification of the rib-like locating means 15 shown in FIG. 4. Here, this means has the form of circular studs 17 providing longitudinally spaced apart shoulders and serving the same purpose as the longitudinal projection 15 described in FIG. 4. FIG. 5 also shows a modified lower side of the head 13. Instead of fixing the head's position in the plate by inserting it partly or fully in a slot (numeral 37 in FIG. 3) or a cut-out (number 35 in FIG. 4), pointed corner projections 31 are provided at the lower side of the head 13 which are adapted to be driven into the surface of the plate 21.

Figure 6:
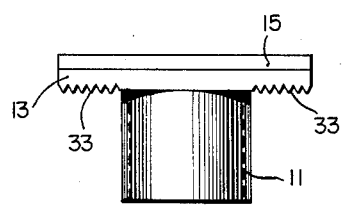
FIG. 6 is a side view of the mount without wiper illustrating another modification of the lower surface of the head.

FIG. 6 shows another modification for achieving surface penetration of the plate 21 by the under side of the head 13. A knurled or grooved surface 33 is provided on the lower face of the head 13, with the ridges or pointed portion preferably made rather sharp to penetrate the surface of a plate in which the wiper mount is to be used. When the mount is secured to the plate 21, these ridges will tend to penetrate or enter the surface of the plate 21 to prevent rotary dislocation.

Means on the lower side of the head 13, such as the projections 31 of FIG. 5 or the knurling 33 of FIG. 6 to actually extend below the upper surface of the plate 21, or alternatively, a cut-out portion of the plate 21 closely embracing a noncircular portion of the bottom of the head 13, constitute an important feature to prevent the mount from turning in its hole.

It will be apparent that my improved wiper mount is relatively simple and may be economically manufactured.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. An electrical wiper assembly comprising, in combination, a plate having a circular aperture therethrough, a wiper mount of T-shape configuration and comprising an electrically conductive shank member and an electrically conductive head member, said shank member constituting an open ended tube slidably fitting the aperture of the plate, said head member being rectangular in shape and having a longitudinal dimension substantially greater than the diameter of the shank member and a transverse dimension approximating the diameter of the shank member, said head member having the mid section thereof rigidly secured to one end of the shank member in crossing relation thereto and closing the end opening thereof, said head member having an underside portion thereof entering the plate and thereby holding the wiper mount from turning movement relative to the plate, means projecting above the upper side of the head member providing centrally located shoulder portions on the opposite end sections thereof, an electrical wiper of resilient electrically conductive material composed of a U-shaped base portion and a pair of flexible prongs forming upwardly bent extensions of the two legs of the U-shaped base portion, said U-shaped base portion of the wiper being secured to the upper side of the head member such that the legs of the base portion extend longitudinally of the head member in straddling close-fitting relation to the shoulder portions thereof thereby to hold the wiper from turning movement relative to the head member, and laterally projecting means on the end of the shank member opposite to the head member engaging the adjacent side of the plate and cooperating with the head member to tightly clamp the wiper mount to the plate, said last-mentioned end of the shank member being opened to receive the terminal end of a lead-in wire for connection to the wiper mount interiorly of the shank member.

2. An electrical wiper assembly comprising, in combination, a plate having a circular aperture therethrough and a substantially rectangularly shaped recess on one side thereof opening into the aperture, a wiper mount of T-shaped configuration and comprising an electrically conductive shank member and an electrically conductive head member, said shank member constituting an open ended tube slidably fitting the aperture of the plate, said head member having a rectangular shape corresponding to that of the recess of the plate and being rigidly secured to one end of the shank member in crossing relation thereto and closing the end opening thereof, said head member being seated in closely fitting relation in the recess of the plate and thus being held from turning movement relative to the plate, means projecting above the upper side of the head member providing centrally located shoulder portions on the opposite end sections thereof, an electrical wiper of resilient electrically conductive material formed of a U-shaped base portion and a pair of flexible prongs integrally connected to and forming upwardly bent extensions of the two legs of the U-shaped base portion, said U-shaped base portion of the wiper being secured to the upper side of the head member such that the legs of the base portion extend longitudinally of the head member in straddling close fitting relation to the shoulder portions thereof thereby to hold the wiper from turning movement relative to the head member, and means adjacent to the end of the shank member opposite to the head member engaging the adjacent side of the plate and cooperating with the head member to tightly clamp the wiper mount to the plate, said last-mentioned end of the shank member being opened to receive the terminal end of a lead-in wire for connection to the wiper mount interiorly of the shank member.

3. An electrical wiper assembly comprising, in combination, a wiper mount of T-shape configuration and comprising an electrically conductive shank member and an electrically conductive head member, said shank member constituting an open ended tube, said head member being rectangular in shape and having a longitudinal dimension substantially greater than the diameter of the shank member and a transverse dimension approximating the diameter of the shank member, said head member having the midportion thereof rigidly secured to one end of the shank member in crossing relation thereto and closing the end opening thereof, the upper side of the head member being shaped on its longitudinal median line to provide shoulder portions on opposite sides of the axis of the shank member and spaced apart from one another greater than the diameter thereof, an electrical wiper of electrically conductive resilient material formed of a U-shaped base portion and a pair of flexible prongs forming upwardly bent extensions of the two legs of the U-shaped base portion, said U-shaped base portion of the wiper being secured to the upper side of the head member and such that the legs of the base portion extend longitudinally of the head member in straddling relation to the elevation and in close fitting relation to the shoulder portions thereof whereby the wiper is held from turning movement relative to the head member.

References Cited in the file of this patent

UNITED STATES PATENTS

| 1,100,178 | Forsberg | June 16, 1914 |
| 1,559,683 | Douglas | Nov. 3, 1925 |
| 1,648,797 | Cohen et al. | Nov. 8, 1927 |
| 1,912,653 | Olson | June 6, 1933 |
| 2,046,701 | Sandin | July 7, 1936 |
| 2,270,166 | Hiensch et al. | Jan. 13, 1942 |
| 2,825,799 | Julien | Mar. 4, 1958 |

FOREIGN PATENTS

| 809,214 | Germany | July 26, 1951 |
| 1,193,793 | France | May 4, 1959 |